July 19, 1960
D. L. ATKINSON
2,945,959
PICKOFF RESPONSIVE TO DISPLACEMENT BETWEEN
RELATIVELY MOVABLE MEMBERS
Filed May 3, 1957
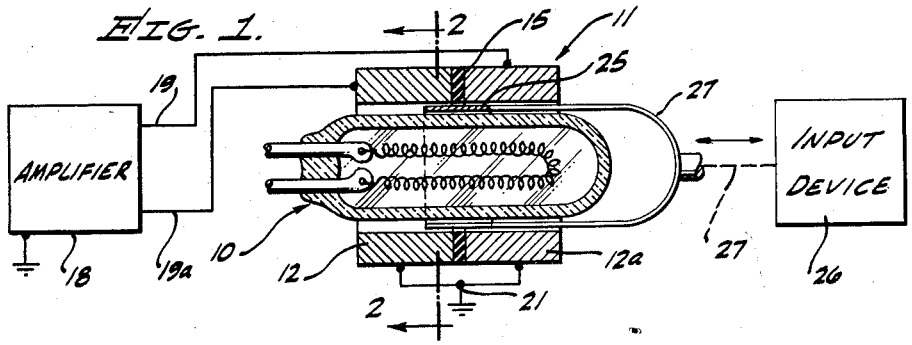
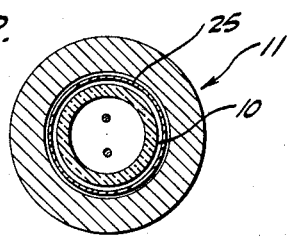
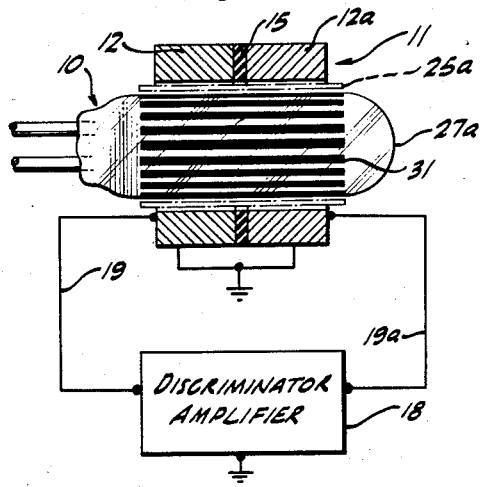
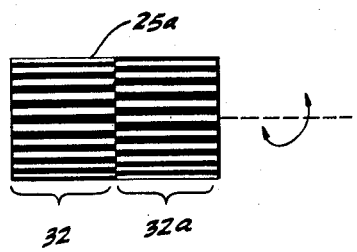
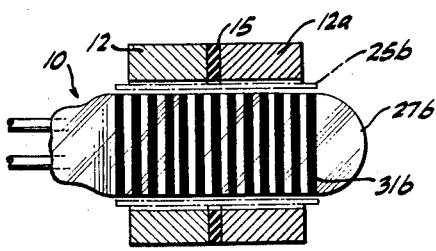
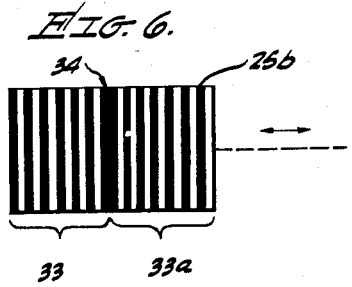
INVENTOR.
DONALD L. ATKINSON,
BY Harold J. Downes
ATTORNEY.

United States Patent Office 2,945,959
Patented July 19, 1960

2,945,959

PICKOFF RESPONSIVE TO DISPLACEMENT BETWEEN RELATIVELY MOVABLE MEMBERS

Donald L. Atkinson, Grand Rapids, Mich., assignor to Lear, Incorporated

Filed May 3, 1957, Ser. No. 656,859

8 Claims. (Cl. 250—237)

This invention relates to a transducer of the type sometimes termed a signal pickoff. More particularly it has reference to a pickoff operating on photovoltaic principles whereby the two relatively movable parts of the one device are characterized by virtually negligible mass and correspondingly low inertia in order to provide extremely rapid response and also impose minimum load on the instrument with which the pickoff is associated and, therefore, interfere least with the performance of the instrument.

As important examples of the environment to which the invention is particularly adapted are those instruments which utilized gyroscopes for translating the relative position of two objects into an electrical signal such as an attitude gyroscope used in aerial navigation, guided missiles, etc. Inasmuch as extreme accuracy is a prime requisite in these applications it becomes important to minimize all possible load factors which may introduce spurious precessive forces. A pickoff mounted to sense the angular displacement of one gimbal of a gyroscope with respect to another gimbal or to a fixed reference must not only be capable of sensing displacements of minute magnitude but must also respond in direction. Even though designed and manufactured with the utmost care it is possible for the two parts of a signal pickoff to possess minor unbalance and friction of an extent which can easily result in torques of a character evidencing themselves as unwanted precessive forces. Obviously a reduction in mass will decrease the unbalance except that the necessary decrease in mass (size) is often contra-indicated by other considerations. For example, in the case of a synchro the minimum size of the stator may be limited by the machines available for winding the toroid.

The principal object of this invention is to provide a pickoff which may be fabricated in sub-miniature proportions and therefore characterized by extremely low inertia of the moving part or parts.

Another object is to provide a pickoff which is sensitive to displacements of very low order and will yield a phase-discriminated usable output at those displacements.

A further object lies in providing a pickoff in accordance with the foregoing which is extremely rugged notwithstanding its miniature size.

An additional object is to provide a pickoff which embodies no inherent friction.

A further object is to provide a photoelectric pickoff which is adapted to utilize the luminous source most advantageously.

Still another object is to provide a pickoff as aforesaid which supplies an output signal which is linear over its predetermined useful range.

A further object is to provide a pickoff which is adaptable, with little or no change, to a large variety of applications.

Other objects and advantages of the invention will become apparent from the ensuing description which, taken with the accompanying drawing, discloses certain preferred embodiments of the invention.

In this drawing:

Fig. 1 is a view, partly in longitudinal cross section of a pickoff in accordance with the invention and in its relation to an input device and an output-taking device;

Fig. 2 is a cross section taken on the line 2—2 of Fig. 1;

Fig. 3 is a view similar to Fig. 1 of an alternative form of the invention;

Fig. 4 is a detail of the shutter employed with the pickoff of Fig. 3;

Fig. 5 shows another alternative form of the pickoff; and

Fig. 6 is a detail of the shutter employed with the pickoff of Fig. 5.

In Figs. 3 and 5 the movable shutter has been shown in phantom for clarity.

Broadly regarded the invention utilizes a source of radiation such as a light source mounted within a cylindrical shutter which is connected to one of the relatively displaceable members providing the signal. Such displacement may be translatorial or rotational. Exteriorly of the shutter and coaxial therewith is a pair of hollow, cylindrically-shaped radiation sensitive surfaces such as photovoltaic cells or supports having a cylindrical interior coated with photovoltaic material. The photocells or their equivalent are mounted coaxially as a unit for movement with the other of the displaceable members and are connected to inject the input voltage into an amplifier discriminator. At the null position of the displaceable members the output voltage is zero, viz. the luminous flux impinging on each of the photosensitive surfaces generates equal and opposite voltages. However, any shift of the shutter in an axial direction will unbalance the flux reaching the respective cells and a voltage will be generated which has a magnitude proportional to the amount of displacement and a phase corresponding to the direction thereof. By positioning the shutter very closely to the light source and the photocells very close to the shutter and by arranging all on a common axis maximum efficiency is attained for a low value of available illumination and for a low order of displacement. In an alternative aspect the invention device is adapted to respond to a rotational input. In this case interfering longitudinal, opaque striations carried on a transparent support adjacent the light source and also carried on a transparent shutter provide the necessary action. The shutter striations are arranged for phase discrimination. In still another alternative the linearly-moving shutter described initially may be replaced by a circumferentially opaquely-striated support adjacent the light source and a circumferentially opaquely-striated shutter wherein the distribution of the striations is arranged for phase discriminations.

In accordance with the invention the transducer comprises a fixed pickoff member including a light source 10 and a light-responsive member 11. Both the source and member are desirably commonly and rigidly mounted to maintain concentricity there between. Where, herein, I refer to the fixed and movable parts of the pickoff I intend to use these adjectives in their relative, and not their absolute sense since it is the relative displacement there between which gives rise to the output voltage. Inasmuch as the mounting of the fixed part 11 is optical depending upon the environment no particular arrangement has been illustrated. In order, at this juncture, to provide a more complete understanding of the invention one form of the invention has been made having an overall outside diameter of $\frac{7}{32}$″ and an overall length of approximately $\frac{1}{4}$″.

The elements 12—12a comprising the active portions of the fixed part 11 are shown as hollow cylinders of photovoltaic material or may consist of a suitable support having two cylindrical, interior zones coated with such material. Elements 12—12a are rigidly united concentrically and separated by suitable electric insulating means e.g. a washer 15. Means, not shown, serve to mount the assembly 11 upon one of the relatively movable members. The elements 12—12a are connected for differential action, in a manner to be detailed, to a discriminator amplifier 18 by conductors 19—19a and a common ground 21. Other electronic means may be utilized for receiving the output e.g. a Wheatstone bridge.

The light source may be an incandescent lamp 10 having a filament which will provide luminous flux at least coextensive with that longitudinal region of the assembly 11 over which the shutter of the movable pickoff part has its excursion. Conveniently, the light source is carried rigidly with the assembly 11 by any suitable means (not shown), and the leads to the filament are supplied with current in an obvious manner.

The movable part of the pickoff comprises a hollow cylindrical shutter 25 of opaque material mounted intermediate the assembyl 11 and the lamp 10 for movement coaxially thereof. An input device 26 is connected to the shutter 25 by any suitable linkage 27 which varies with the particular application. It will be clear that the device 26 represents one of the two relatively displaceable members to which the pickoff is responsive and that the linkage 27 will be capable of translating such displacement into some proportional displacement of the shutter. As alluded to above the assembly 11 is mounted on the other of the displaceable members. For convenience of illustration the linkage 27 is shown as connected to the shutter 25 by means of a stirrup 27 although the mode of connection forms no part of the invention per se.

In the null position of the displaceable members, e.g. a pair of gimbals of a gyroscope, the output signal is zero; the shutter 25 is at some calibrated, substantially central location longitudinally of the member 11; and the output of the amplifier is zero. When some new position of the gimbals is assumed, the shutter 25 is shifted to the left or right of null whereby to increase the light flux impinging on one of the cells 12 or 12a and to decrease that on the other. Thus the differential voltage resulting therefrom serves as an input signal to the amplifier and the output thereof may consequently be employed for any function which is dependent on the gimbal displacement. It will be seen that the action of the shutter is quantitative as well as qualitative, i.e. the device provides a signal voltage proportional to the mechanical movement of the shutter and in proper phase.

It has been found that devices in accordance with the described embodiment provide a linear response up to a shutter movement in either direction equal to one-half the axial length of the shutter. In one practical embodiment the length of the shutter was approximately two-thirds the width (axial length) of either the element 12 or 12a.

In order to attain greatest efficiency the clearances between the lamp and the shutter and between the shutter and the photosensitive surface is kept to the absolute minimum consistent with operating reliability. By utilizing a cylindrical configuration maximum utilization of the light output is realized.

Figs. 3 and 4 illustrate an alternative embodiment in which parts like those of Figs. 1 and 2 are assigned the same reference numerals. In this embodiment, intended to sense rotational displacement, a substantially cylindrical lamp 27a is employed and is provided with longitudinally disposed, opaque striations 31 uniformly spaced about the periphery of the lamp and substantially coextensive lengthwise with the elements 12 and 12a. If desired the striations may be applied to a separate cylindrical support adjacent the lamp and concentric with the photoelectric surfaces. The width and spacing of the striations may vary depending upon the relative movement of the members to which the pickoff is responsive. The maximum angular displacement on each side of null will correspond to the circular pitch of the striations, viz., the spacing thereof about the central axis as measured on the mean circumference of the striations.

The shutter 25a (shown displaced to the right as Fig. 4 for clarity) is of hollow cylindrical form and is connected in any suitable manner to one of the sensed members for translating angular movement thereof into rotation of the shutter. Obviously a gear train may be used for increasing or decreasing the ratio of movement of the shutter relative to the member to which the shutter responds. The shutter is transparent and carries two sets of opaque striations 32 and 32a offset circumferentially one pitch distance but otherwise of the same angular extent pitch as the striations 31.

Amplitude of displacement is measured by the degree of registration or non-registration of the striations and the corresponding transmission of light through the inter-striation spaces. Phase discrimination is achieved by the angular offset of the set 32 with respect to the set 32a since each thereof affects the light reaching one or the other of the cells 12 or 12a. That is to say, with the shutter in an extreme position whereat the striations 32 are coextensive the inter-striation spaces of the striations 31 the cell 12 will receive no illumination while the cell 12a will receive maximum illumination since the striations 32a will then be aligned with the striations 31. The other extreme will exist when the foregoing situation is reversed. Any intermediate condition will result in one cell 12 or 12a receiving more or less light than the other cell thus resulting in the differential response required.

The sensitivity of the foregoing arrangement may be adjusted by varying the circular pitch and/or width of the striations. This may range from 360°, i.e. one opaque area of 180° to the other extreme which is limited to the maximum number of striations which can be practically applied to the parts, taking into consideration, of course, any error due to mechanical backlash. At the present state of the art 25,000 lines per inch appears possible as indicated by the finest resolution available on photographic film. Thus, based on a bulb of ⅛" diameter approximately 6,400 striations are possible, corresponding to a sensitivity from null of only 102 seconds of arc.

Another embodiment is shown in Figs. 5 and 6 and which form is adapted only for rectilinear response. Again the shutter is shown disassociated from the assembly. In this case the lamp 27b is provided with a plurality of circumferentially extending, equal width, equally spaced, opaque striations 31b and the shutter 25b is provided with two sets of circumferential striations 33 and 33a which are of the same width and spacing as the striations 31b except at the center where the striation 34 is equal in width to two of the striations 33 or 33a. Stated otherwise, if all of the even numbered striations 33 on the left side are opaque then all of the even numbered striations 33a on the right must be transparent. The spacing on the shutter 25b may be varied from the completely opaque version disclosed in Fig. 1, namely, one opaque striation to one having 25,000 striations per inch corresponding translationally to the rotational mode set forth in connection with Figs. 3 and 4. Thus, using 25,000 striations per inch, a movement of 0.00002" in either direction from null will yield full output. Phase discrimination occurs as a result of the different distribution of the spacing of the two sets of striations of the shutter and as will be evident from the description given for Figs. 3 and 4.

Although the lamp 10 has been described as mounted for movement with the assembly 11 it will be apparent that the lamp may be mounted for movement with the shutter or even independently mounted.

From the foregoing it will have become clear that I have provided a pickoff capable of linear response over its working range, which may embody sensitivity of very high order together with phase discrimination, and which is of extremely low inertia and small dimensions.

While I have shown certain embodiments of my invention, it will be understood, of course, that I do not wish to be limited thereto since many modifications may be made and I therefore contemplate by the appended claims to cover any such modifications as fall within the true spirit and scope of my invention.

I claim:

1. A transducer for sensing the magnitude and direction of displacement of two relatively movable objects comprising a fixed hollow cylindrical part mounted for movement with one of the objects having two adjacent, separated zones of photovoltaic material on the interior surface thereof, a light source within and on the axis of said cylindrical part, a movable part mounted for movement with the other object having an opaque area adapted to be interposed between said source and said photovoltaic zones in a differential manner in accordance with the magnitude and direction of displacement of the objects and terminals for connecting the zones to a device for utilizing the differential current output of the transducer for a control function.

2. A transducer for sensing the magnitude of displacement of two relatively movable objects comprising a fixed part carried by one of the objects including a pair of coaxial, hollow cylindrical elements comprising photovoltaic material on the respective interior faces, said elements being rigidly connected by a dielectric element, a light source within said part for exciting the photovoltaic material, a hollow cylindrical opaque shutter operatively connected to the other object for movement proportional thereto, said shutter being interposed between said source and fixed part and concentric therewith, the shutter having an axial length less than the total axial length of said material and positioned to vary the light impinging on the material elements in a differential manner in accordance with the movement of said other object, and electrical terminals for connecting the material to a device for utilizing the differential current output of the transducer for a control function.

3. A transducer in accordance with claim 2 wherein said elements and lamp are commonly mounted.

4. A transducer in accordance with claim 2 wherein said shutter and lamp are commonly mounted.

5. A transducer for sensing the magnitude and direction of displacement of two relatively movable objects, comprising a pair of hollow cylindrical, dielectrically-separated, coaxial photovoltaic elements; a light source positioned substantially at the axis thereof; a hollow cylindrical support of transparent material adjacent the source and surrounding the same, said support and elements being commonly mounted and secured to one of the objects for movement therewith, said support having a plurality of axially-extending, circumferentially-equal, equally spaced, opaque striations on the curved surface thereof; a hollow cylindrical shutter of transparent material positioned intermediate said support and elements, concentric therewith and secured to the other object for movement therewith, said shutter having a first set of axially-extending, circumferentially-equal, equally spaced, opaque striations on the curved surface thereof and extending over an area of said surface substantially coextensive with the area of one of said elements when the shutter is in null position; and a second set of axially-extending, circumferentially-equal, equally spaced, opaque striations on the curved surface thereof and extending over an area of said surface substantially coextensive with the area of the other of said elements, the circumferential dimension and spacing of both sets of shutter striations being equal; the subtended angle of said shutter striations and of the spacing therebetween being equal to the subtended angle of the said first plurality of striations, the sets of striations being relatively circumferentially offset by one circular pitch distance; and electrical terminals for connecting said elements to a device for utilizing the differential current output of the transducer for a control function.

6. A transducer for sensing displacement of two relatively movable objects, comprising a pair of hollow cylindrical, dielectrically-separated, coaxial, photovoltaic elements; a light source positioned substantially at the axis thereof; a hollow cylindrical support of transparent material adjacent the source and surrounding the same, said support and elements being commonly mounted and secured to one of the objects for movement therewith, said support having a first plurality of circumferentially-directed, axially equal, equally spaced, opaque striations over the axial length thereof; a hollow cylindrical shutter of transparent material positioned intermediate said support and elements, concentric therewith and secured to the other object for movement therewith, said shutter being substantially equal to the combined axial length of said elements and having a first set of circumferentially directed, axially equal, equally spaced opaque striations over one-half the axial length thereof and a second set of circumferentially directed, axially equal, equally spaced, opaque striations over the remaining one-half of the length of said shutter, the axial distribution of said first and second sets of striations being such that in the null position of the shutter the second set of striations aligns with said plurality of striations and the second set of striations aligns with the interstriation spaces of said first plurality; and electrical terminals for connecting said elements to a device for utilizing the differential current output of the transducer for a control function.

7. A transducer for sensing the displacement of two relatively movable objects comprising a pair of coaxial, axially-spaced, hollow cylindrical, photosensitive surfaces mounted on a common support adapted to move with one of the objects, a light source substantially on the axis of said surfaces, and opaque means interposed between said source and surfaces operatively connected to the other object for varying the amount of illumination impinging on said surfaces in a differential manner in accordance with the relative movement of the surfaces and means.

8. Means for producing an electrical signal of magnitude in response to displacement between two bodies comprising a source of radiation, a radiation-sensitive closed concave surface and surrounding said source producing an electrical signal in response to radiation from said source, and means disposed between said source and said surface and operable in response to said displacement for varying the amount of illumination from said source which reaches said surface.

References Cited in the file of this patent

UNITED STATES PATENTS

| | | |
|---|---|---|
| 1,514,123 | Bacevicz | Nov. 4, 1924 |
| 1,634,420 | Grondahl | July 5, 1927 |
| 1,956,590 | Pressler | May 1, 1934 |
| 2,265,149 | Crane et al. | Dec. 9, 1941 |
| 2,371,963 | LaPierre | Mar. 20, 1945 |
| 2,406,299 | Koulicovitch | Aug. 20, 1946 |
| 2,432,303 | Fox | Dec. 9, 1947 |
| 2,674,154 | Crandall | Aug. 6, 1954 |
| 2,788,519 | Caldwell | Apr. 9, 1957 |